(12) United States Patent
Kobayashi et al.

(10) Patent No.: US 6,335,912 B1
(45) Date of Patent: Jan. 1, 2002

(54) OPTICAL INFORMATION RECORDING APPARATUS, METHOD FOR RECORDING OPTICAL INFORMATION, OPTICAL INFORMATION RECORDING MEDIUM, OPTICAL INFORMATION PROCESSING APPARATUS, AND METHOD FOR ACCESSING OPTICAL INFORMATION RECORDING MEDIUM

(75) Inventors: Seiji Kobayashi; Tamotsu Yamagami, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/626,716

(22) Filed: Jul. 27, 2000

(30) Foreign Application Priority Data

Aug. 9, 1999 (JP) ............................................ 11-224770

(51) Int. Cl.[7] .................................................. G11B 7/00
(52) U.S. Cl. ................ 369/59.1; 369/59.25; 369/59.17; 369/53.11
(58) Field of Search .............................. 369/47.1, 47.11, 369/47.15, 47.16, 47.17, 47.12, 47.28, 53.1, 53.11, 53.41, 59.1, 59.11, 59.13, 59.17, 59.23, 59.25, 59.26, 124.1, 124.15

(56) References Cited

U.S. PATENT DOCUMENTS 5,452,284 A * 9/1995 Miyagawa et al. ...... 369/44.28
5,657,312 A * 8/1997 Hayashi ................... 369/275.3

* cited by examiner

Primary Examiner—Muhammad Edun
(74) Attorney, Agent, or Firm—Oblon, Spivak, McClelland, Maier & Neustadt, P.C.

(57) ABSTRACT

An optical information recording apparatus detects an irradiated position by a laser beam, and modulating additional information in accordance with a track address and angular information as the results of the position detecting to record the modulated additional information at a prescribed position on an optical information recording medium.

31 Claims, 8 Drawing Sheets

SCANNING DIRECTION

SCANNING DIRECTION

OPTICAL INFORMATION RECORDING APPARATUS, METHOD FOR RECORDING OPTICAL INFORMATION, OPTICAL INFORMATION RECORDING MEDIUM, OPTICAL INFORMATION PROCESSING APPARATUS, AND METHOD FOR ACCESSING OPTICAL INFORMATION RECORDING MEDIUM

BACKGROUND OF THE INVENTION

1. Field of the Invention

The present invention relates to an optical information recording apparatus, a method for recording optical information, an optical information recording medium, an optical information processing apparatus, and a method for accessing an optical information recording medium, and is applicable to, for example, an optical disk and an optical disk apparatus. The present invention detects a laser beam irradiation position for recording additional information modulated in accordance with a result of the position detection at a prescribed position, and thereby makes it possible to easily determine whether an optical disk is an illegal copy or not.

2. Description of the Related Art

Conventionally, an optical disk such as a compact disk and a Digital Versatile Disk (DVD) has been designed so that its information recording surface is divided into a plurality of concentric circles and an International Federation of the Phonographic Industry (IFPI) code is recorded at the innermost concentric circle with the object of preventing illegal copies.

That is, the compact disk, the DVD and the like are designed so that a recording area for Table Of Contents (TOC) is formed on the outer circumferential side to the innermost concentric circle where the IFPI code has been recorded and user data such as audio data recorded in outer circumferential areas following to the TOC data recording area can be accessed on the TOC data.

On the other hand, the IFPI code is made up of caved seals composed of symbols indicating a maker, a factory, a disk number and the like, formaking it possible to determine whether the optical disk is an illegal copy or not byverifying the source and so on of the optical disk by means of checking with a human eye.

Now, if an optical disk apparatus, which reproduces such a kind of optical disk, can determine on its side whether a loaded optical disk is an illegal copy or not and execute a treatment in accordance with a result of the determination, it is considerable that the interest of a copyright holder can effectively be protected.

In this case, a method is conceivable where it is determined whether an optical disk is an illegal copy or not by utilizing the IFPI code. However, there is a problem that it is difficult to easily determine whether an optical disk is an illegal copy or not on the optical disk apparatus side by utilizing the IFPI code because the IFPI code is made for the verification using a human eye. In addition, there is another problem that an illegal copy with a copied IFPI code itself is difficult to be determined under this method.

SUMMARY OF THE INVENTION

The present invention was made from consideration of the aforementioned matters, and aims to propose an optical information recording apparatus, a method for recording optical information, an optical information recording medium for being applied to those apparatus and method, an optical information processing apparatus for accessing the optical information recording medium, and a method for accessing the optical information recording medium, which are capable of easily determining whether an optical disk is an illegal copy or not.

For resolving such problems, according to the first embodiment of the present invention, there is provided an optical information recording apparatus detecting a first irradiation position by a first laser beam with reference to a reproduction signal, generating a modulating signal by modulating additional information in accordance with the position detection result and modulating a second laser beam by the modulating signal to irradiate an optical information recording medium with the modulated second laser beam, and then irradiating a second irradiation position distant from the first irradiation position by the first laser beam by a prescribed distance at least in a direction perpendicular to a track with the modulated second laser beam.

According to the first embodiment, by selecting the prescribed distance suitably, the additional information such as a disk identification code can be recorded in a manner that it is difficult to copy the additional information without substantially damaging the reproduction of the ordinal information recorded as a pit train or a mark train. Besides, by processing a reproduction signal detected at the time of reproducing the ordinal information recorded as the pit train or the mark train, the additional information recorded in a manner described above can be reproduced. Consequently, it becomes possible to determine whether an optical disk is an illegal copy or not on the additional information.

Furthermore, according to the second embodiment of the present invention, there is provided a method for recording an optical information detecting a first irradiation position by a first laser beam with reference to a reproduction signal, generating a modulating signal by modulating additional information in accordance with the position detection result and modulating a second laser beam by the modulating signal to irradiate an optical information recording medium with the modulated second laser beam, and then irradiating a second irradiation position distant from the first irradiation position by the first laser beam by a prescribed distance at least in a direction perpendicular to a track with the modulated second laser beam.

According to the second embodiment, advantages similar to those of the first embodiment can be obtained.

Furthermore, according to the third embodiment of the present invention, there is provided an optical information recording medium including additional information to a data recorded on a track composed of a first pit train or a first mark train, which information is recorded as a second pit train or a second mark train disposed substantially parallel to the track at a position distant from the track by a prescribed distance, and which prescribed distance is set to be a distance where a signal level of are production signal, which varies in accordance with the first pit train or the first mark train, varies in accordance with the additional information when the reproduction signal is detected by irradiating the track with a laser beam on the track.

According to the third embodiment, advantages similar to those of the first embodiment can be obtained.

Furthermore, according to the fourth embodiment of the present invention, there is provided an optical information processing apparatus for detecting a reproduction signal, a signal level of which varies in accordance with a first pit train or a first mark train, by irradiating a track composed of the first pit train or the first mark train with a laser beam, and reproducing additional information formed by a second pit train or a second mark train formed in the vicinity of the track on a cross talk component mixed to the reproduction signal by processing the reproduction signal.

According to the fourth embodiment, the additional information recorded as the second pit train or a second mark train formed in the vicinity of the track can also be reproduced by utilizing an optical system for reproducing the information recorded on the track. Consequently, the additional information recorded in a manner that it is difficult to be copied can be reproduced with a simple structure. Hence, it becomes possible to determine whether an optical disk is an illegal copy or not with reference to the reproduced additional information.

Furthermore, according to the fifth embodiment of the present invention, there is provided an optical information processing apparatus detecting a reproduction signal, a signal level of which varies in accordance with a first pit train or a first mark train, by irradiating a track composed of the first pit train or the first mark train with a laser beam, and reproducing additional information formed by a second pit train or a second mark train formed in the vicinity of the track on a cross talk component mixed to the reproduction signal.

According to the fifth embodiment, advantages similar to those of the fourth embodiment can be obtained.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 2, comprising FIGS. 2(A)–2(C), describes an optical disk to be loaded on the optical disk recording apparatus shown in FIG. 1, in which FIG. 2(A) is a perspective view, FIG. 2(B) is a mimetic diagram showing an allocation of contents to be recorded in an inner circumferential area of the optical disk shown in FIG. 2(A), FIG. 2(C) is a top view showing a part of an upper surface of the inner circumferential area of the optical disk shown in FIG. 2(A);

FIGS. 7(A)–7(E), illustrates the operation of the optical disk apparatus shown in FIG. 6, in which FIGS. 7(A), 7(C) and 7(E) are diagrams of signal waveforms, and FIGS. 7(B) and 7(D) are top views showing parts of upper surfaces of optical disks; and with FIG. 8 is a block diagram showing a second decoding circuit in the optical disk apparatus shown in FIG. 6.

DESCRIPTION OF THE PREFERRED EMBODIMENTS

Hereinafter, drawings are suitably referred while preferred embodiments of the present invention are described in detail.

(1) Structure of an Embodiment

Figure 1:
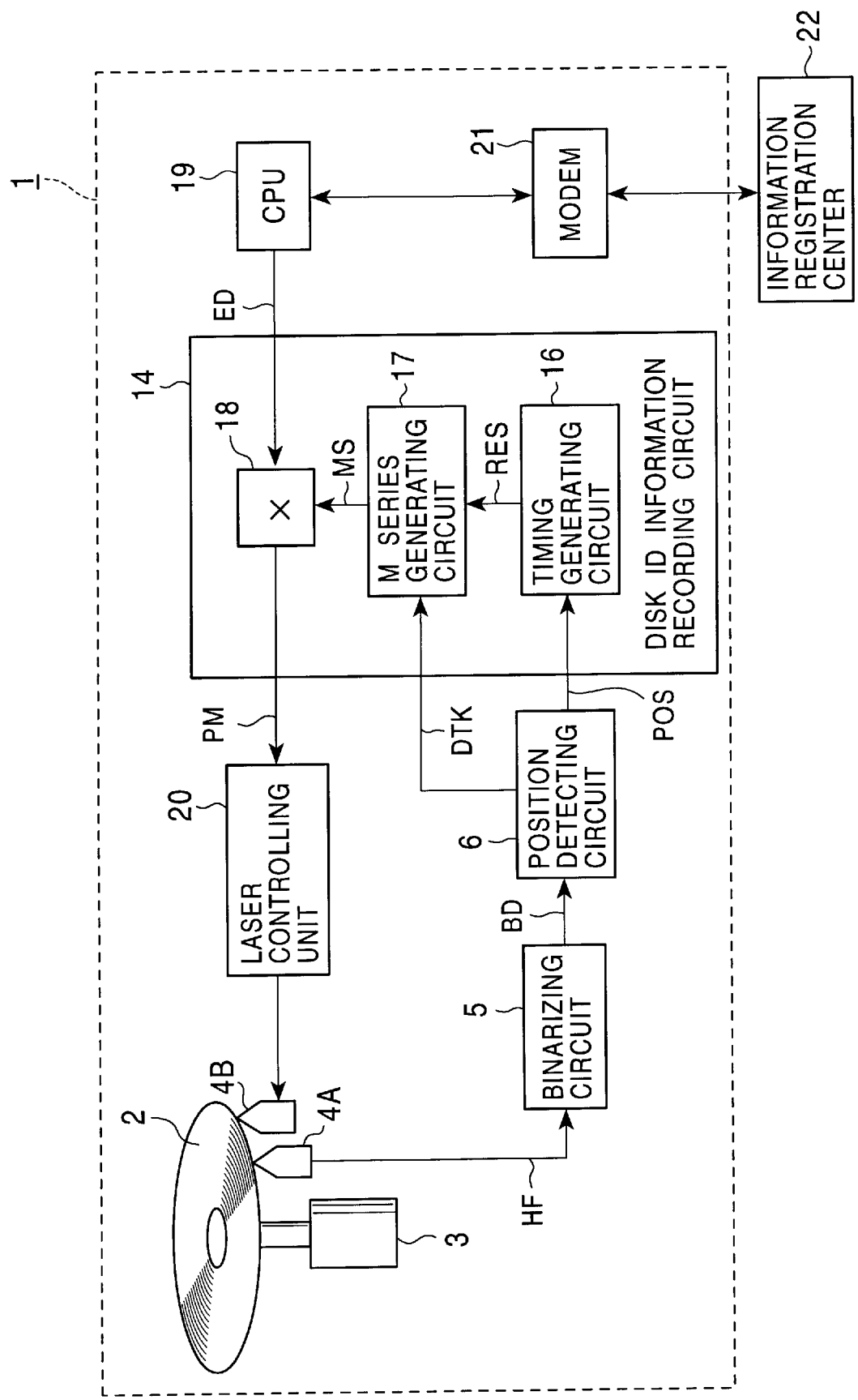
FIG. 1 is a block diagram showing an optical disk recording apparatus of an embodiment according to the present invention.

FIG. 1 is a block diagram showing an optical disk recording apparatus of an embodiment according to the present invention. The optical disk recording apparatus 1 additionally records disk ID information ED on an optical disk 2 during its production process. Incidentally, the disk ID information ED is an identification data issued by an information registration center 22, which will later be described, and a peculiar data is allotted to each optical disk 2.

The optical disk 2 is a phase change type optical disk capable of recording and erasing desired data, and the information recording surface thereof is made so as to be accessed on the condition that the angular velocity of the optical disk 2 is constant. That is, the optical disk 2 has spiral or concentric tracks and address areas ARD are radially formed on the information recording surface of the optical disk 2, as shown in FIG. 2(A), and headers and track addresses as address information are recorded in the address areas ARD as first pit trains, as shown in FIGS. 2(B) and 2(C). Incidentally, the track addresses are used for detecting track numbers at the time of accessing.

Furthermore, the information recording surface of the optical disk 2 are divided into a plurality of concentric circles, and areas except for the address areas ARD in the outer circumferential side area are allotted for data areas AR1. In the data areas ARI, grooves operating as guide grooves for a laser beam are formed. The optical disk 2 is designed so that it is accessed on the grooves for recording desired data and for reproducing the data recorded in the data areas AR1.

On the other hand, the optical disk 2 is designed so that areas in the inner circumferential area except for the address areas ARD are allotted for servo adjusting area AR2 so that adjusting signals necessary for adjusting a servo circuit are recorded as the first pit trains. Incidentally, the adjusting signals are composed of, for example, data for removing offsets of focus servo control, and the like.

Hence, the optical disk 2 is designed so that in its inner circumferential area, headers, track addresses and adjusting signals are repeatedly recorded every prescribed angular sphere around the central point of the optical disk 2 as shown in FIGS. 2(B) and 2(C).

Because those first pit trains are formed to be arranged on a prescribed basic frequency and the optical disk 2 operates on the condition that the angular velocity of the optical disk 2 is constant in the present embodiment, those first pit trains of the optical disk 2 are formed by the minute standard angle $\Delta$ corresponding to the basic frequency between tracks adjoining in a radius direction. In this connection, because the first pit trains are allocated to be the same pattern between the adjoining tracks in the header areas, the first pit trains are aligned in the radius directions in the header areas.

Hence, the optical disk 2 is designed so that channel clocks can be reproduced on variations of signal levels of reproduction signals corresponding to the minute rotation angles $\Delta$.

The optical disk recording apparatus 1 drives to rotate the optical disk 2 with a spindle motor 3 so that the angular velocity of the optical disk 2 is constant. The optical disk recording apparatus 1 emits a laser beam from an optical pick-up 4A on the optical disk 2 while the optical disk recording apparatus 1 drives the optical disk 2, and thereby the optical disk recording apparatus 1 detects a position to be accessed. On the result of detecting the access position, the disk ID information ED is recorded by the optical pick-up 4B.

Figure 3:
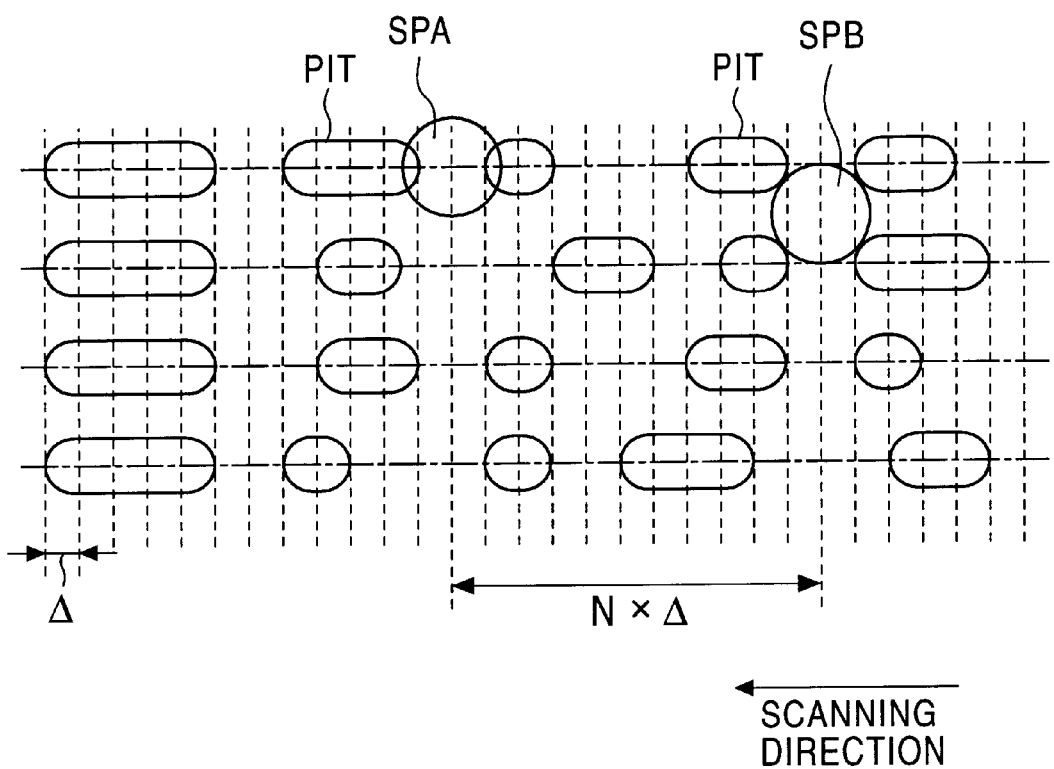
FIG. 3 is a top view showing a part of an upper surface of the optical disk shown in FIG. 2(A) together with beam spots emitted by an optical pick-up used in the optical disk recording apparatus shown in FIG. 1.

The optical pick-ups 4A and 4B are constructed so as to seek in a radius direction while interlocking with a not shown thread mechanism. As shown in FIG. 3, in regard to the relationship of the positions of a beam spot SPA formed by the optical pick-up 4A and a beam spot SPB formed by the optical pick-up 4B on the surface of the optical disk 2, the beam spot SPA scans the surface of the optical disk 2 so as to precede the beam spot SPB by a prescribed angle N×Δ, which is an angle equal to integer number times as much as the standard angle Δ, in conformity with the setting of the mechanism for seeking.

Furthermore, the optical pick-ups 4A and 4B are designed to be controlled by the servo circuit so that the beam spot SPB formed by the optical pick-up 4B scans the intermediate position between the track scanned by the beam spot SPA formed by the optical pick-up 4A and an track adjoining the track scanned by the beam spot SPA when the beam spot SPA is performing the scanning in a state of just tracking. Thus, the optical pick-ups 4A and 4B are designed so that one side beam spot SPB performs the scanning operation thereof in a state of being offset by a prescribed distance from the other side beam spot SPA.

Hence, the optical pick-up 4A constitutes a reproduction signal detecting means for detecting a reproduction signal HF the signal level of which varies in accordance with the first pit trains formed on the optical disk 2 as an optical information recording medium by irradiating tracks composed of the first pit trains with a first laser beam and by receiving a returning beam.

A binarizing circuit 5 binarizes the reproduction signal HF outputted by the preceding optical pick-up 4A by comparing the reproduction signal HF with a prescribed slice level, and outputs a binarized signal BD.

A position detecting circuit 6 detects position information of an irradiation position by the laser beam with reference to the binarized signal. Next, the position detecting circuit 6 outputs angular information POS and an track address DTK as the position information of laser beam irradiation positions by the following optical pick-up 4B.

Figure 4:
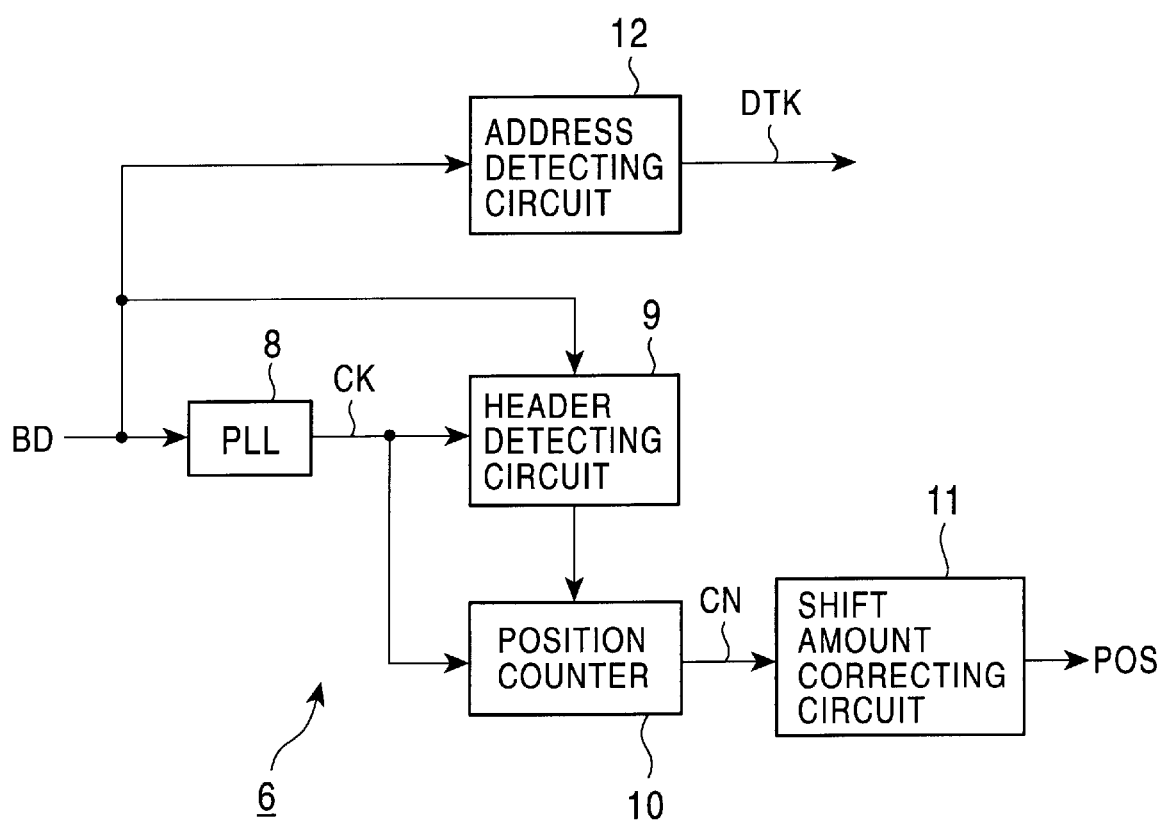
FIG. 4 is a block diagram of a position detecting circuit in the optical disk recording apparatus shown in FIG. 1.

Now, FIG. 4 is a block diagram showing the position detecting circuit 6. In the position detecting circuit 6. phase-locked loop (PLL) 8 is a standard for generating second pit trains because it operates on the binarized signal BD. The PLL 8 also reproduces a channel clock CK the signal level of which changes at a period for which the irradiation position of the laser beam changes by the standard angle Δ.

A header detecting circuit 9 detects a header from the binarized signal BD by latching the binarized signal BD in turn with reference to the channel clock CK to determine the pattern of continuing signal levels. The header detecting circuit 9 outputs a header detection signal the signal level of which rises when the header appears in the binarized signal BD on the results of the detection of the header.

A position counter 10 clears its counted value CN with reference to the header detection signal outputted from the header detecting circuit 9, and counts the channel clock CK in turn to output the counted value CN. Hence, the position counter 10 is designed to output the position information of the laser beam irradiation positions by the optical pick-up 4A by the standard angle Δ as the counted value CN based on the headers.

A shift amount correcting circuit 11 adds offset value N to the counted value CN, whose offset value N corresponds to the delay of the beam spot SPB scanning the optical disk 2 by the optical pick-up 4B from the beam spot SPA by the optical pick-up 4A. Hence, the position detecting circuit 6 is designed to output the radius direction position information as the angular information POS with regard to the laser beam irradiation positions by the optical pick-up 4B with a unit of the standard angle Δ and based on the headers. Incidentally, in a case where the standard angle Δ is set to be $4.8 \times 10^{-4}$ degrees and one header is allotted every concentric circle of the optical disk 2, the position detecting circuit 6 outputs the angular information POS the value of which is N to N+750000.

An address detecting circuit 12 detects the track address DTK by processing the binarized signals BD with reference to the channel clock CK, and outputs it. Thereby, the position detecting circuit 6 is designed to outputs the position information in radius directions of the laser beam irradiation positions by the optical pick-up 4B as the track address DTK. Hence, the position detecting circuit 6 constitutes a position detecting means for detecting an irradiation position of the first laser beam emitted by the optical pick-up 4A on the reproduction signal HF to output a result of the position detection. The position detecting circuit 6 outputs the angular information being the position information in the circumferential direction of the optical disk 2 and track addresses being position information in the radial direction of the optical disk 2.

A disk ID information recording circuit 14 generates modulating signals PM by processing the disk ID information ED with reference to the track address DTK and the angular information POS.

That is, in the disk ID information recording circuit 14, a timing generating circuit 16 outputs an initialization signal RES for initializing an M series generating circuit 17 when the angular information POS outputted from the position detecting circuit 6 reaches a prescribed value The M series generating circuit 17 is composed of a combination of a plurality of cascaded flip-flops and a plurality of exclusive OR circuits, and generates M series signals MS by setting an initial value on the initialization signal RES and by performing cyclic operations on the initial value with reference to the channel clock CK to output them. At this time, the M series generating circuit 17 prevents from repeating M series signals MS having the same bit arrangements at the rotation period of the optical disk 2 by changing previously set initial values to be set in accordance with the track address DTK. Here, the M series signals MS are random number signals of M series binary numeral series.

The exclusive or circuit (X) 18 generates exclusive OR signals between the disk ID information ED outputted from a central processing unit (CPU) 19 and the M series signals MS, and outputs the generated exclusive OR signals as the modulating signals PM. For the disk ID information ED, one bit of a prescribed number of clocks of the channel clock CK is allotted. The disk ID information ED is outputted from the central processing unit 19 in a prescribed timing based on the track address DTK and the angular information POS. Thereby, in the optical disk recording apparatus 1, the disk ID information ED is designed to be recorded with keeping a prescribed relative relationship to the data recorded as the first pit trains.

Thus, the exclusive OR circuit 18 outputs the M series signals MS as modulating signals PM when the disk ID information ED is on the logic level 0, and outputs inverted M series signals MS as the modulating signals PM when the disk ID information ED is on the logic level 1. Hence, the exclusive OR circuit 18 outputs the disk ID information ED disturbed by the M series signal MS.

Hence, the disk ID information recording circuit 14 constitutes a modulating signal generating means for generating modulating signals PM by modulating the disk ID information ED being additional information in accordance with the results of position detection by the position detecting circuit 6 as the position detecting means. Moreover, the timing generating circuit 16 and the M series generating circuit 17 constitute a binary numeral train generating means for generating prescribed binary numeral trains in accordance with the results of the position detection, and the exclusive OR circuit 18 constitutes an operating means for generating the modulating signals by operating the binary numeral trains and the additional information.

Using those elements, the optical disk recording apparatus 1 records the disk ID information ED in a prescribed relative positional relationship to the tracks, and sets the M series signals MS for being disturbed by the disk ID information ED in a prescribed relative positional relationship to the tracks.

Figure 5A:
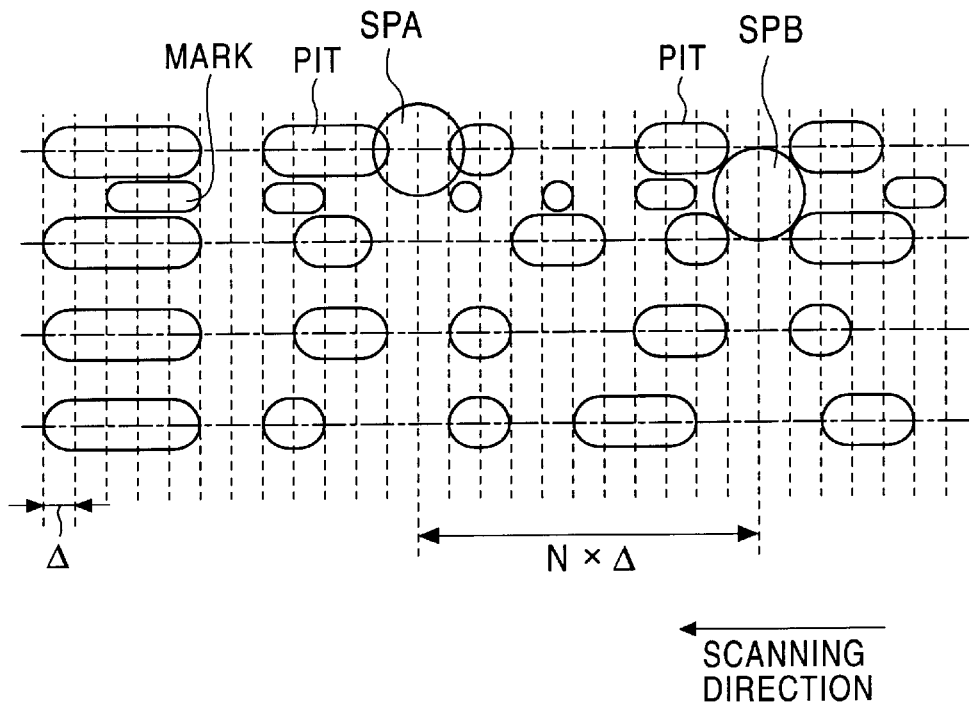
FIGS. 5A and 5B are top views showing a part of an upper surface of the optical disk shown in FIG. 2 (A) together with beam spots emitted by an optical pick-up used in the optical disk recording apparatus shown in FIG. 1, respectively.

A laser controlling circuit 20 drives a laser diode in the optical pick-up 4B in conformity with the modulating signals PM to intermittently raise the light amount of the laser beam emitted by the optical pick-up 4B. Thereby, as shown in FIG. 5A, marks and spaces are formed in turn between the tracks composed of the first pit trains by the scanning of the beam spot SPB from the optical pick-up 4B, and thereby the disk ID information ED is additionally recorded. Incidentally, the reflectance of such marks made by the laser beam, the light amount of which is raised intermittently, generally rises locally due to the characteristic of a reflection record membrane.

Hence, the laser controlling circuit 20 and the optical pick-up 4B constitute a laser beam irradiation means for recording additional information on the optical information recording medium by modulating a second laser beam in conformity with the modulating signal and by irradiating the optical information recording medium with the modulated second laser beam.

A modem 21 connects a line with the information registration center 22 in conformity with the control of the central processing unit 19 to obtain the disk ID information ED of the optical disk 2 from the information registration center 22, and then informs the obtained disk ID information ED to the central processing unit 19. By performing such an operation, the information registration center 22 is a control center of the disk ID information ED, which issues the disk ID information ED peculiar to the optical disk 2 in response to the requirement from the central processing unit 19.

Figure 5B:
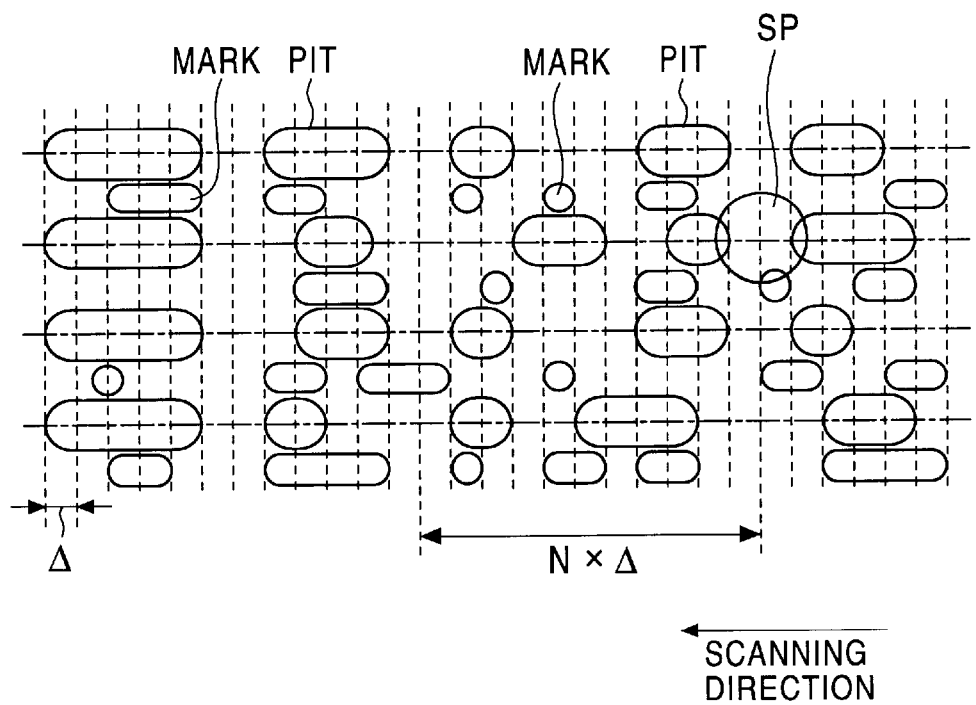

The central processing unit 19 is a controller for controlling the whole operation of the optical disk recording apparatus 1, and forms the marks and the spaces in turn in the inner circumferential side servo adjusting area AR2 of the optical disk 2, as shown in FIG. 5B, by controlling the thread mechanisms of the optical pick-ups 4A and 4B. Besides, at the same time, the central processing unit 19 outputs the disk ID information ED obtained through the modem 21 in turn by the bit in a long bit period synchronized with the change of the M series signals MS.

In a manufacturing process of the optical disk 2, the disk ID information ED is recorded in the inner circumferential side servo adjusting area AR2 before the optical disk 2 is detached from the optical disk recording apparatus 1 to be packed for being supplied in general circulation.

Consequently, in the present embodiment, the disk ID information ED is additionally recorded to each optical disk 2 to be supplied for the use of a user.

When the optical disk 2 with the disk ID information ED in the form of the marks and the spaces thus recorded between the pit trains is reproduced by an ordinary optical disk apparatus, as shown in FIG. 5B, the beam spot SP from the optical pick-up of the optical disk apparatus scans on the tracks composed of first pit trains. Consequently, reproduction signals obtained from the beam spot SP includes the variations of the signal level due to the marks and the spaces in addition to the variations of the signal level due to the first pit trains, and the variations of the signal level due to the marks and the spaces are reproduced to be superimposed on the variations of the signal level due to the first pit trains as if they are cross talks.

In the present embodiment, the disk ID information ED is reproduced on the variations of the signal level due to the marks and the spaces that was contained as if they are cross talks.

Figure 6:
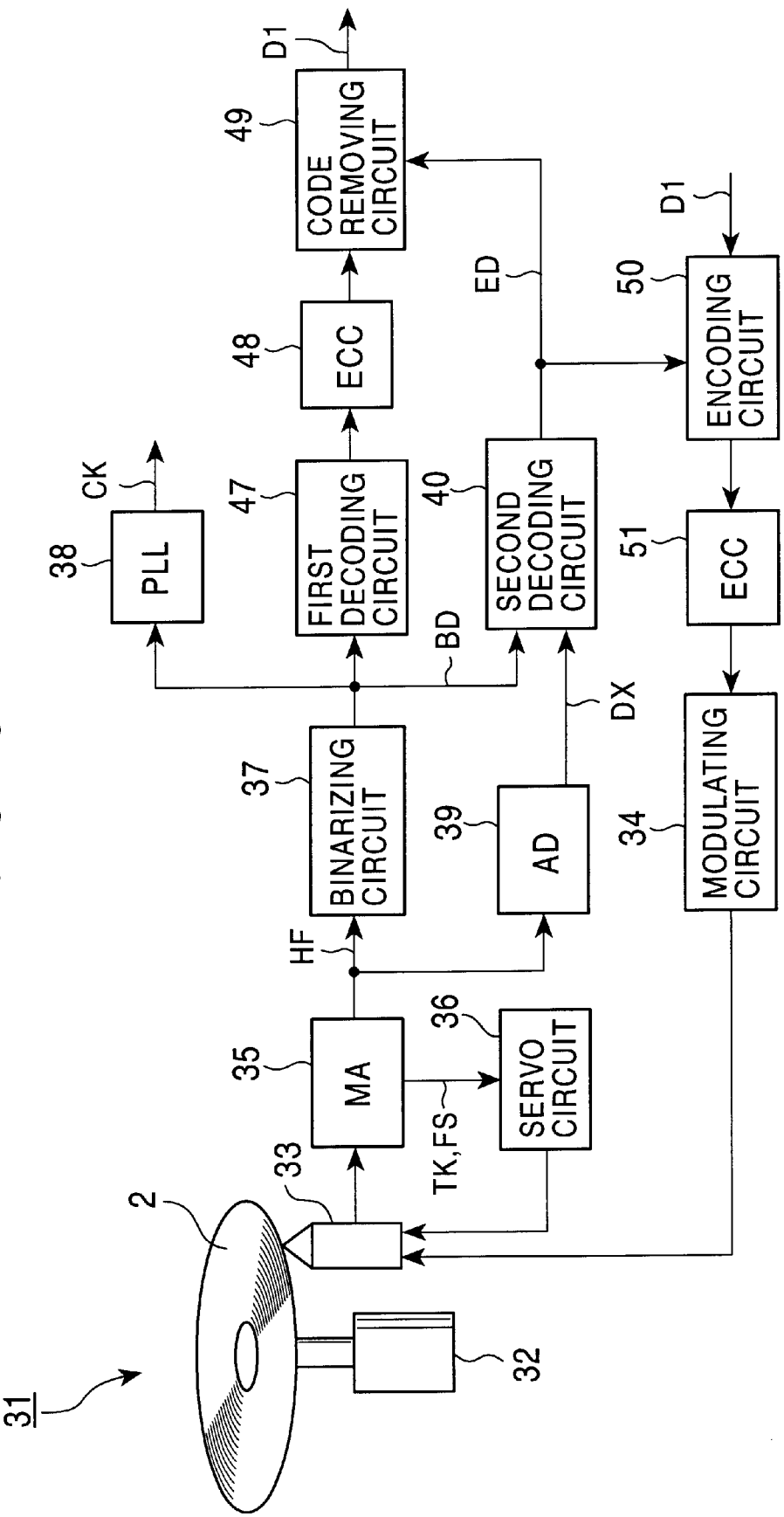
FIG. 6 is a block diagram of an optical disk apparatus of an embodiment according to the present invention for accessing an optical disk produced by the optical disk recording apparatus shown in FIG. 1.

FIG. 6 is a block diagram showing an optical disk apparatus for accessing the optical disk 2. In the optical disk apparatus 31, a spindle motor 32 drives to rotate the optical disk 2 so that the angular speed of the optical disk 2 is constant in conformity with the control by a spindle servo circuit not shown.

An optical pick-up 33 emits a laser beam to the optical disk 2, and receives a returning beam with a prescribed light-receiving element to output the results of the light-receiving. The optical-pick up 33 intermittently raises the amount of the laser beam according to output signals of a modulating circuit 34 at the time of recording, and thereby records desired data by forming marks and spaces in turn in the data areas AR1 of the optical disk 2.

A matrix circuit (MA) 35 outputs tracking error signals TK, the signal levels of which vary in accordance with the amount of de-tracking, with reference to grooves in areas where grooves have been formed and pit trains in areas where pit trains have been formed by performing matrix operation processing of the results of the light-receiving of the returned beam of the beam outputted from the optical pick-up 33. In addition, the matrix circuit 35 similarly generates focusing error signals FS the signal levels of which vary according to the amount of de-focusing. Furthermore, the matrix circuit 35 generates reproduction signals HF, the signal levels of which vary according to the pit trains and the mark trains, in the inner circumferential side servo adjusting area AR2 and the address areas ARD.

Hence, the optical pick-up 33 and the matrix circuit 35 constitute a reproduction signal detecting means for detecting the reproduction signals HF, the signal levels of which vary according to the pit trains by irradiating the tracks where the pit trains have been formed with the laser beam.

A servo circuit 36 performs the tracking control and the focusing control of the optical pick-up 33 with reference to those tracking error signals TK and focusing error signals FS.

Figure 7:
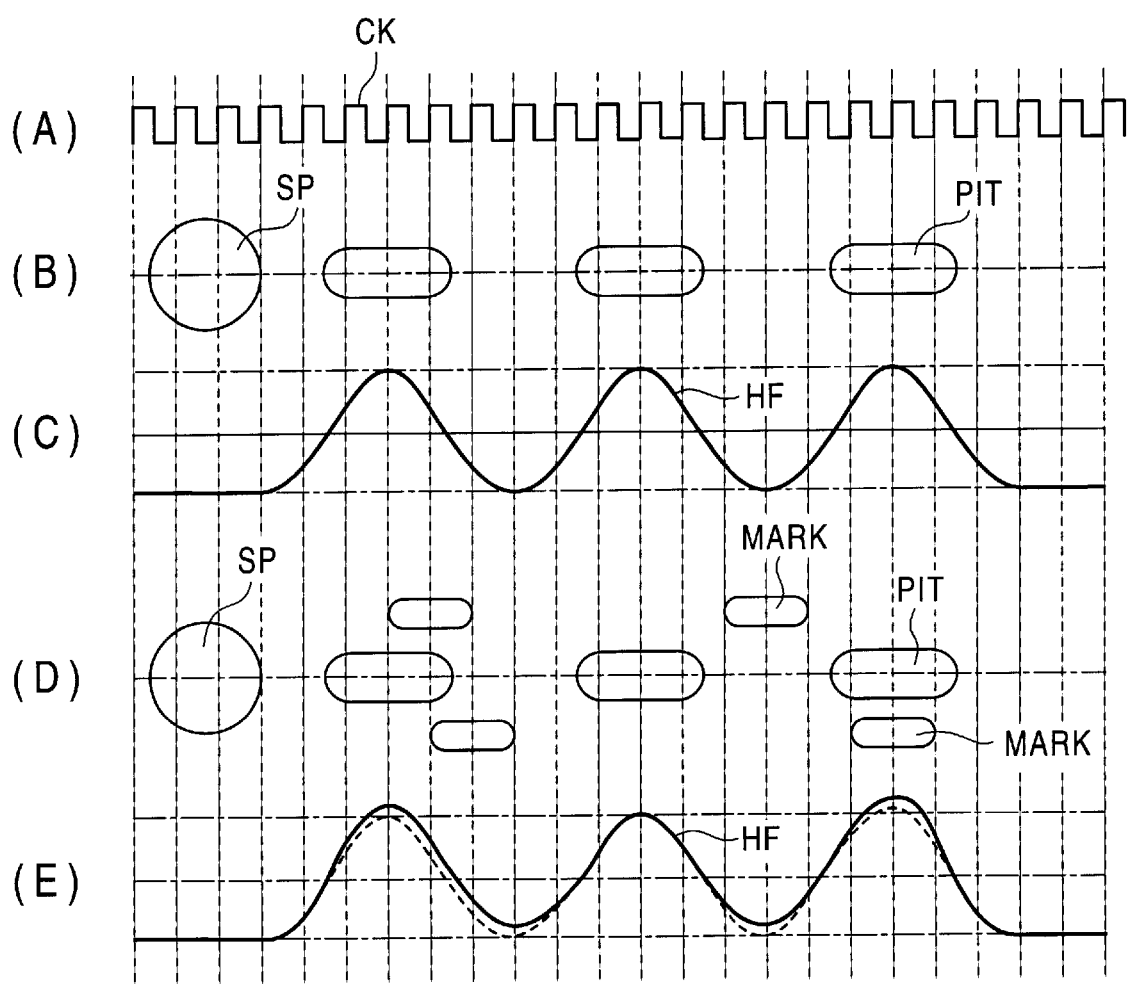
FIG. 7, comprising

Thus, the optical disk apparatus 31, as shown in FIG. 7, performs its tracking control so that the beam spot SP scans the track centers composed of pit trains and generates the reproduction signals HF the signal levels of which vary in accordance with the pit trains in case of an optical disk that has no disk ID information ED (FIGS. 7(B) and 7(C)).

In a case where the optical disk apparatus 31 accesses the optical disk 2 that has recorded disk ID information ED, the optical disk apparatus 31 similarly performs its tracking control so that the beam spot SP scans the track centers composed of pit trains and generates the reproduction signals HF the signal levels of which vary in accordance with the pit trains as well as in accordance with the marks and the spaces (FIGS. 7(D) and 7(E)). In FIG. 7(E), there is shown a dotted line showing a reproduction signal level in a case where the marks and the spaces are not formed, for comparison.

A binarizing circuit 37 performs the binarizing of the reproduction signal HF with a prescribed slice level, and outputs the binarized signal BD. A PLL 38 reproduces the channel clock CK to output it by operating with reference to the binarized signal BD (FIG. 7(A)).

An analog-digital converting circuit (A/D) 39 performs the analog-digital conversion on the reproduction signal HF with reference to the channel crock CK, and outputs an 8 bit digital reproduction signal DX that is a result of the conversion.

A second decoding circuit 40 reproduces and outputs the disk ID information ED by processing the digital reproduction signal DX with reference to the binarized signal BD.

Figure 8:
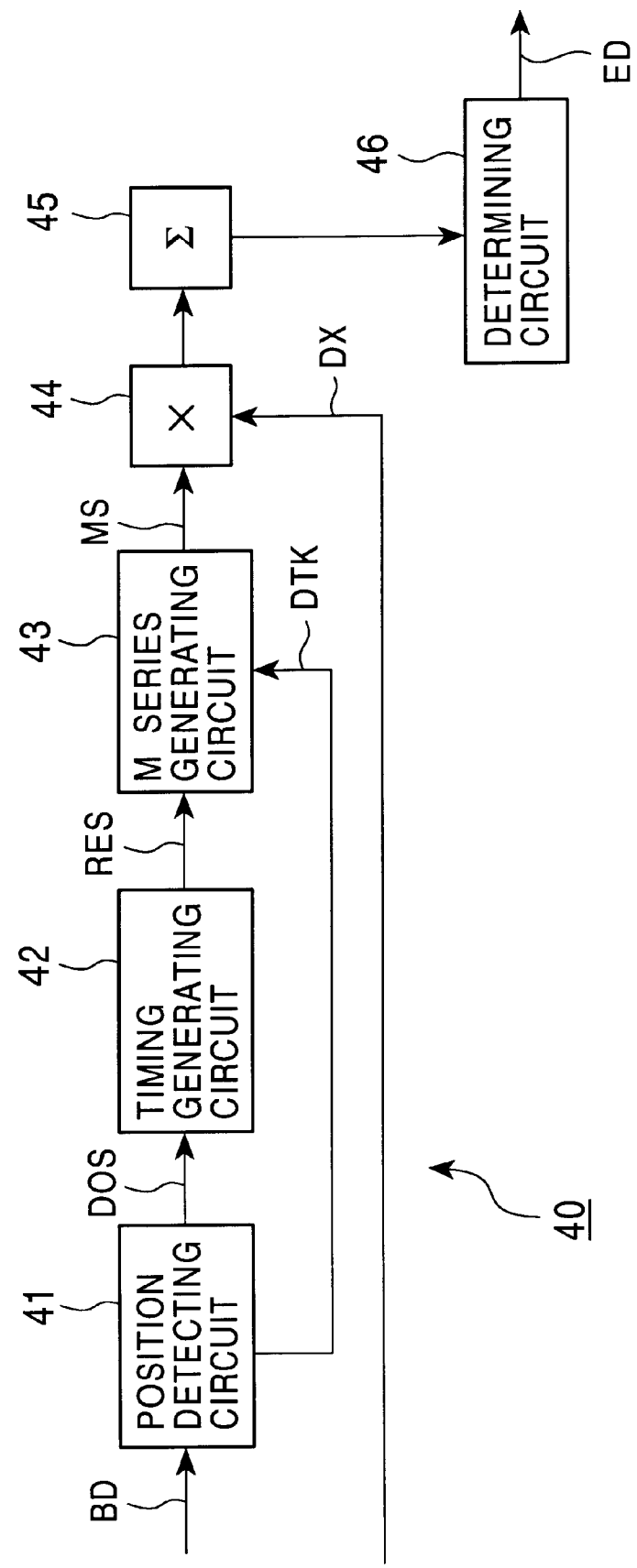

As shown in FIG. 8, in the second decoding circuit 40, a position detecting circuit 41 detects the angular information POS and the track address DTK as the position information of the laser beam irradiating position by the optical pick-up 33 by processing the binarized signal BD in the same way as the position detecting circuit 6 mentioned above in respect of the optical disk recording apparatus 1.

A timing generating circuit 42 outputs the initialization signal RES for initializing an M series generating circuit 43 on the angular information POS as the position information in the same way as the timing generating circuit 16 mentioned above in respect of the optical disk recording apparatus 1. For executing the aforementioned operation, the timing generating circuit 42 outputs the initializing signal RES in the same timing as the initializing signal RES was generated at the time of recording of the disk ID information ED to the optical disk 2.

The M series generating circuit 43 generates and outputs M series signals similar to the time of recording with reference to the initialization signal RES and the track address DTK.

An digital multiplication circuit (X) 44 multiplies the M series signal MS and the digital reproduction signal DX together to output a result of the multiplication.

An accumulative adder (Σ) 45 is, for example, a digital adder of 24 bits, repeatedly performs the accumulative additions of the multiplication results in a period corresponding to 1 bit of the disk ID information ED by setting the accumulative addition period thereof with reference to the track address detected by processing the reproduction signal HF.

In the digital reproduction signal DX, the signal level of the reproduction signal varies in accordance with the two series of marks and spaces recorded on an inner side circumference and an outer side circumference of the optical disk 2. In the optical disk 2, the M series signal MS is initialized in sequence with reference to the track address DTK, and only in one series of the two series of the marks and the spaces, one bit of the disk ID Information ED is disturbed by an M series signal MS having the same bit arrangement as that of the M series signal MS to be inputted to the digital multiplication circuit 44. Consequently, the accumulative addition values of the accumulative adder 45 converge to a signal level corresponding to the logical value of the disk ID information ED in the series on the side corresponding to the M series signal MS generated by the M series generating circuit 43. On the other hand, the accumulative addition values converge to the logical value 0 in the series on the side not corresponding to the M series signal MS generated by the M series generating circuit 43.

On the contrary, the signal levels of the digital reproduction signals DX reproduced from the pit trains converge to the logical value 0 by accumulative additions for a prescribed period, and consequently the operation results of the multiplications with the M series signals MS having one of the logical values 1 and 0 at an even probability also converge to the logical values 0 by accumulative additions for a prescribed period.

The results of the accumulative additions of the results of multiplications of the digital reproduction signals DX and the M series signals MS thus become values corresponding to the logical value of the disk ID information ED generated by the marks and the spaces corresponding to the M series signal MS generated by the M series generating circuit 43.

A determining circuit 46 determines the accumulative addition results with a prescribed threshold value to reproduce the disk ID information ED in turn for outputting it.

Hence the second decoding circuit 40 constitutes a reproduction signal processing means for processing the reproduction signal HF to reproduce thereby the additional information by mark trains formed at positions nearer to tracks than cross talk components being mixed to the reproduction signal HF. In addition, in the second decoding circuit 40, the position detecting circuit 41, the timing generating circuit 42 and the M series generating circuit 43 constitute a binary numeral train generating means for generating a binary numeral train with reference to the reproduction signal HF; the digital multiplication circuit 44 and the accumulative adder 45 constitute an accumulative adding means for processing the reproduction signal HF by a binary numeral series to accumulatively adding the results of the processing; the determining circuit 46 constitutes a determining means for determining an accumulative addition result by the accumulative adding means to reproduce additional information.

The optical disk apparatus 31 makes the optical pick-up 33 seek to the inner circumferential side of the optical disk 2 to reproduce the disk ID information ED through the second decoding circuit 40 by means of the control of a not shown controller when the optical disk 2 is loaded. Incidentally, the optical disk apparatus 31 reproduces the adjusting signal by processing the binarized signal BD on the channel clock CK, and controls the operation of the servo circuit 36 so as to access the data areas AR1 on the reproduced adjusting signal.

The optical disk apparatus 31 encodes desired data using the thus reproduced disk ID information ED to record the coded data in the data areas ARI. In addition, the opticaldisk apparatus 31 reproduces the data recorded in the data areas AR1 to remove the encoding of the data on the disk ID information ED.

The encoding circuit 50 encodes, for example, a user data D1 inputted from an external apparatus using the disk ID information ED for outputting, and an ECC circuit 51 divides data outputted from the encoding circuit 50 into blocks by the prescribed data amount to perform the interleave process of the blocks of the data. Furthermore, the ECC circuit 51 adds, for example, an error correcting code (ECC) of Reed-Solomon Codes to output the results of interleave process and the error correcting code to the modulating circuit 34.

The modulating circuit 34 performs, for example, the eight to fourteen modulation (EFM) of the data outputted from the ECC circuit 51, and generates a recording signal by adding a synchronization pattern and the like to the results of the modulation. Accordingly, the optical disk apparatus 31 intermittently raises the light amount of the laser beam according to the recording signal to record the encoded user data D1 on the optical disk 2.

On the other hand, at the time of reproducing, a first decoding circuit 47 latches the binarized signal BD in sequence with reference to the channel clock CK. Furthermore, the first decoding circuit 47 processes the results of the latching so as to correspond to the modulating processing at the time of recording, for example EFM modulation, and thereby detects, for example 8 bit parallel reproduced data.

An ECC circuit 48 corrects the errors of the reproduced data on the error correcting code added at the time of recording, and performs the de-interleave processing of the results of the error correction for outputting.

A code removing circuit 49 removes the encoding of the data outputted from the ECC circuit 48 in conformity with the disk ID information ED, and thereby reproduces and outputs the user data D1.

(2) Operation of the Embodiment

Figure 2:
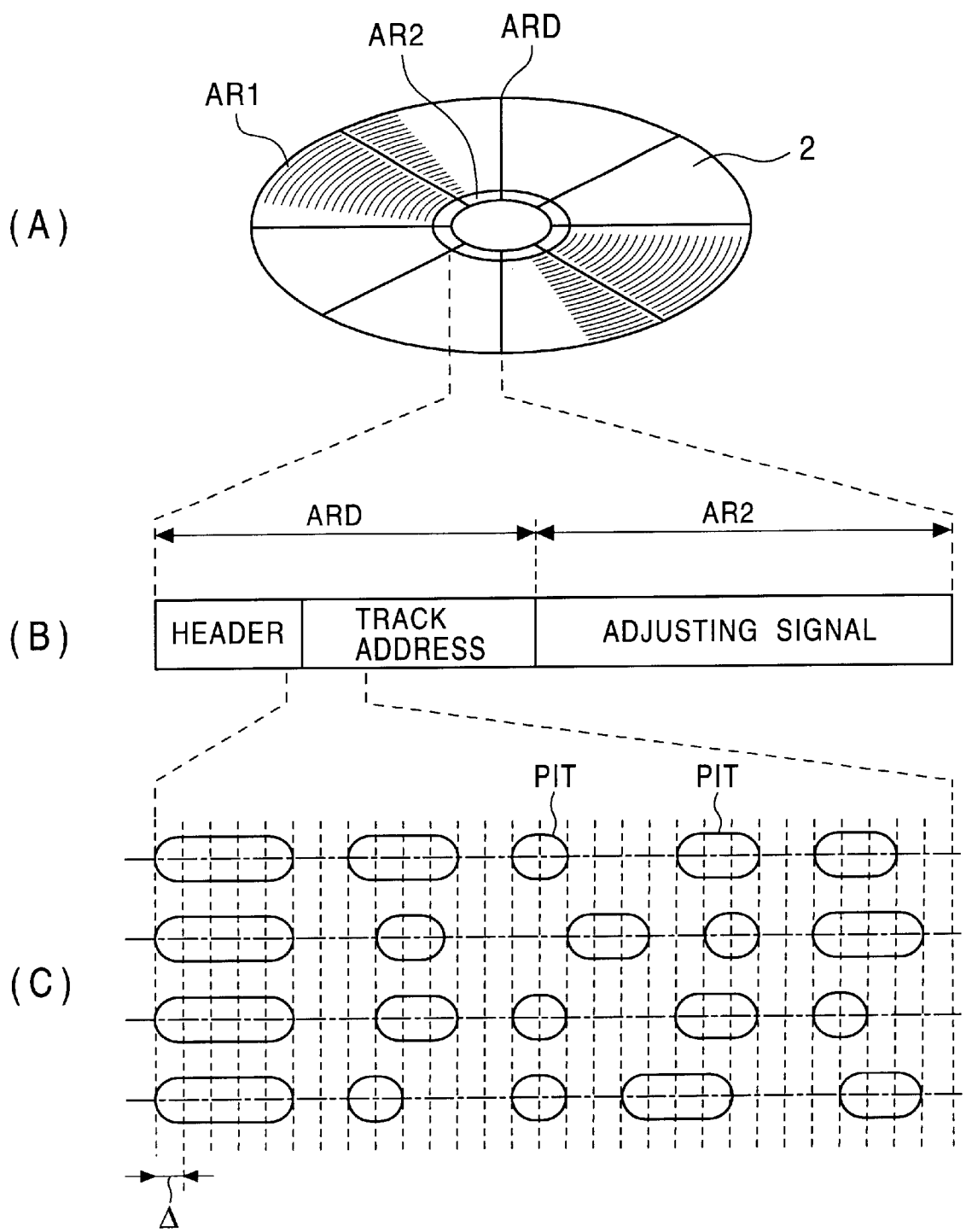

With the aforementioned structure, in the manufacturing processes of the optical disk 2, a disk board on which fine convexoconcave shapes composed of pit trains and grooves are formed is made by the injection molding with a prescribed stamper or a similar method, and a phase change membrane and a protection membrane are formed on the surface of the disk board (FIGS. 1 and 2). On the surface of the optical disk 2, the address areas ARD are radially formed in the fine convexoconcave shapes composed of pit trains indicating the recorded headers and track addresses as shown in FIG. 2, and further the servo adjusting area AR2 is formed in an inner circumferential side area, where the adjusting signal for minutely adjusting an optical means for accessing the optical disk 2 by emitting a laser beam is recorded in a shape of the pit train. In addition, the grooved data areas AR1 are formed on the outer circumferential side.

The optical disk 2 thus made is loaded in the optical disk recording apparatus 1 for obtaining the reproduction signal HF the signal level of which varies in accordance with the pit trains irradiated by the laser beam from the optical pick-up 4A. The obtained reproduction signal HF is binarized by the binarizing circuit 5 to generate the binarized signal BD. The binarized signal BD is processed by the position detecting circuit 6 to detect the laser beam irradiation position by the optical pickup 4A using the track address being the radial direction positional information and the angular information being the circumferential direction positional information to be irradiated by the laser beam. In accordance with the positional information, the track address DTK and the angular information POS both as the positional information for irradiating the laser beam are detected by the optical pick-up 4B which follows thereafter.

In the optical recording apparatus 1, the M series signals MS that are different at each track are generated by the disk ID information recording circuit 14 with reference to the track address DTK and the angular information POS both being the positional information, and the disk ID information ED is disturbed by the M series signals MS. Furthermore, the light amount of the laser beam emitted by the optical pick-up 4B is intermittently raised by the modulating signal PM that is a result of the disturbance, and thereby the relative positional relationship of the beam spot of the laser beam from the optical pick-up 4B on the surface of the optical disk 2 to the tracks is kept in a relationship determined by the positional information. Hence, the disk ID information ED is recorded as a mark train, the reflection factor of which varies, between the tracks formed by pit trains (see FIGS. 5A and 5B).

Consequently, the disk ID information ED can be recorded on the optical disk 2 in a manner that it is impossible to copy the disk ID information ED. That is, the data recorded on a track of an optical disk such as the pit train can be copied by recording the results reproduced by an ordinal reproducing apparatus on a Compact Disc Recordable (CD-R) and the like. However, the disk ID information ED is difficult to be copied by an ordinary reproducing apparatus and an ordinary recording apparatus because the disk ID information ED is data recorded between tracks. Hence, it is possible to make the disk ID information ED of the optical disk 2 hard to be copied.

Furthermore, even if the disk ID information is copied between tracks by, for example, setting a track controlling circuit, the copied disk ID information is different from the optical disk 2 in respect of the relative positional relationship to the tracks. Consequently, it becomes difficult to reproduce correctly the disk ID information disturbed by the M series signals, and thereby copying by such a method also becomes impossible.

Hence, the optical disk 2 can easily be judged whether it is an illegal copy or not by judging whether the disk ID information can correctly be obtained or not.

In the manufacturing process of the optical disk 2, the optical disk 2 thus manufactured so that it is difficult to copy the disk ID information is processed by further processes such as packing to be supplied to users.

As shown in FIG. 6, the optical disk 2 is loaded in the optical disk apparatus 31 under user's care so that user's data are recorded and the recorded user's data are reproduced.

In this case, on the optical disk 2, the user's data are recorded after they were processed in conformity with the encoding process on the disk ID information recorded on the optical disk 2, and then the encoding of the recorded user's data is removed. Consequently, illegal copies using the optical disk 2 can effectively be avoided.

That is, the optical disk apparatus 31 makes the optical pick-up 33 seek to the servo adjusting area AR2 at the innermost circumference to detect the reproduction signal HF, the signal level of which varies in response to the pit train, from the servo adjusting area AR2 when the optical disk 2 was loaded. The signal level of the reproduction signal HF varies in response to the pit train, and the varied signal level further varies in accordance with the disk ID information ED recorded between tracks to be reproduced as shown in FIG. 7.

The thus-detected reproduction signal HF is binarized by the binarizing circuit 37, and then the channel clock CK is reproduced by the PLL 38. Moreover, the track address and the adjusting signal are reproduced by the processing using the channel clock CK, and in the optical disk apparatus 31, the characteristics and the like of the focus controlling circuit in the optical pick-up 33 are set with reference to the adjusting signal.

The reproduction signal HF is converted into a digital value by the analog-digital converting circuit 39 simultaneously and in parallel to the processing by the binarizing circuit 37, and then the disk ID information ED is detected by the second decoding circuit 40.

That is, as shown in FIG. 8, in the second decoding circuit 40, the track address DTK and the angular information POS are detected from the binarized signal BD, and then the M series signal MS that was generated at the time of recording is re-generated by the M series signal generating circuit 43 on the irradiation positional information of the laser beam based on the information of the track address DTK and the angular information POS. Furthermore, in the second decoding circuit 40, the M series signal MS is multiplied by the digital reproduction signal DX, and then the accumulative additions of the multiplied value are repeatedly performed by the accumulative adder 45 with reference to the track address. The results of the accumulative additions are determined by the determining circuit 46, and thereby the disk ID information ED is detected.

That is, in the digital reproduction signal DX, the signal level of the reproduction signal varies in accordance with the 2 series of marks and spaces recorded on an inner side circumference and an outer side circumference of the optical disk 2. In the 2 series of marks and spaces, 1 bit of the disk ID Information ED is disturbed by an M series signal MS having the same bit arrangement as that of the M series signal MS to be inputted to the digital multiplication circuit 44. Consequently, the results of the accumulative additions converge to a signal level corresponding to the logical value of the disk ID information ED in the series on the side corresponding to the M series signal MS same as that at the time of recording. On the other hand, the results of the accumulative additions converge to the logical value 0 in the series on the side not corresponding to the M series signal MS generated by the M series generating circuit 43.

On the contrary, the signal levels of the digital reproduction signals DX reproduced from the pit trains converge to the logical value 0 by accumulative additions for a prescribed period, and consequently the operation results of the multiplications with the M series signals MS having one of the logical values 1 and 0 at an even probability also converge to the logical values 0 by accumulative additions for a prescribed period.

The results of the accumulative additions of the results of multiplications of the digital reproduction signals DX and the M series signals MS thus become values corresponding to the logical value of the disk ID information ED generated by the marks and the spaces corresponding to the M series signal MS generated by the M series generating circuit 43. Consequently, it is possible to decode the disk ID information ED by determining the accumulative addition values.

Furthermore, even if the variations of the signal level of the reproduction signal HF influenced by the recorded disk ID information ED are small, namely even if the variations of the signal level of the reproduction signal HF are minute in such a degree that the variations of the signal level do not influence the data reproduction based on the pit train, the disk ID information ED can correctly be decoded by performing the accumulative additions of the multiplication results for a prescribed period, and by determining the accumulative addition values.

Hence, the data recorded between tracks on the optical disk 2 can be reproduced with an optical pick-up having the same structure for detecting an ordinal optical disk, and thereby interests of a copyright holder can effectively be protected by detecting the disk ID information ED with the simply structured optical disk apparatus 31.

As mentioned above, since it is difficult to detect such disk ID information ED in a case where the optical disk was made by simply copying the pit trains of the original disk, the optical disk apparatus 31 easily determines such an illegal copy. Besides, in a case where the disk ID information ED is separately copied between tracks, the relative relationship between the tracks and the M series signals cannot be maintained, and consequently the accumulative addition values by the accumulative adder 45 do not correctly reflect the local values of the disk ID information ED. Hence, it can be made to be impossible to decode correctly the disk ID information recorded on the optical disk made by copying the original disk in such a manner, and thereby the present invention can effectively deal with such illegal copies.

In the optical disk apparatus 31, user data D1 outputted from an external apparatus are processed to be codes on the disk ID information ED, and then are recorded on the optical disk 2. In addition, the data recorded on the optical disk 2 are reproduced, and then the encoding of the data is removed with reference to the disk ID information ED.

When the disk ID information ED is demodulated in conformity of M series, modulating signals PM have one of the logical values 1 and 0 at an even probability. Consequently, the disk ID information ED is recorded on the optical disk 2, on which the modulating signals PM have been recorded, in a manner that the low frequency components of the disk ID information ED are suppressed.

On the other hand, a low frequency swell, or a low frequency fluctuation, is generally observed in the reproduction signal HF detected at the time of reproducing the optical disk 2. When the disk ID information ED is reproduced by the optical disk apparatus 31, the influence of such a kind of low frequency fluctuations in optical disks can effectively be avoided to be reproduced surely.

Furthermore, the disk ID information ED is recorded in a state that the frequency spectrum thereof is widely expanded due to the disturbance by the M series signals MS. Consequently, the adjusting signal can be recorded or reproduced without being influenced by the increase of pit errors and the like.

In addition, when the reproduction signal HF is observed with an oscilloscope, the information indicating the disk ID information ED can be observed like a noise due to the disturbance by the M series signal MS, and consequently it is made to be difficult to discover the recording of such a kind of the disk ID information ED. This fact also makes it possible to avoid the illegal copying effectively.

(3) Advantages of the Embodiment

According to the aforementioned structure, an irradiation position of the laser beam by the optical pick-up 4B is detected by the optical pick-up 4A, and the disk ID information ED as the additional information is modulated to be recorded at a prescribed position in accordance with the results of the position detection. Thereby, it can easily be done to determine whether an optical disk is an illegal copy or not.

By detecting the positional information on the angular information and the radius information of the optical disk, the additional information can be recorded at a prescribed position with a simple structure.

In addition, by setting the prescribed position between tracks, the additional information can be reproduced by processing signal components mixed to the reproduction signals from the pit trains as cross talks at the time of reproducing. Consequently, it can be possible to determine whether an optical disk is an illegal copy or not with a simple structure corresponding to such a disposition.

Furthermore, by means of generating binary numeral series to modulate the additional information together with the fact that the binary numeral series are M series signals, the additional information can be recorded under a relative relationship with tracks, and thereby it becomes possible to effectively cope with an illegal copy with separately recorded additional information.

Furthermore, by changing M series signals every prescribed period to be different at inner circumference and at outer circumference of a track, a desired one in the 2 series mark trains can surely be reproduced as the additional information.

That is, on the reproducing side, by detecting the additional information from the cross talk components mixed to the reproduction signal, the additional information recorded between tracks in such a manner that it is difficult to be copied can easily and surely be reproduced.

Furthermore, by generating the binary numeral series so as to correspond to ones at the time of recording to detect the additional information, and by a fact that the binary numeral series is the M series signals, it is made to be impossible to detect the additional information of an optical disk being an illegal copy for surely detecting the illegal copy.

Furthermore, by encoding desired data with the additional information to record the encoded desired data on an optical disk, and further by removing the encoding recorded on the optical disk, it becomes possible to avoid an illegal copy of optical disk 2 in case of providing the optical disk 2 to an enduser, for example, with the recording of the desired data.

(4) Other Embodiments

In the aforementioned embodiment, although the case where the M series signals were initialized every period of a track address was described, the present invention is not limited to the case. In a word, by setting the additional information to be different at inner circumference and at outer circumference of a track, and by reproducing one series of data among reproduced data obtained by scanning a track, advantages similar to those of the aforementioned embodiment can be obtained by initializing the M series signals at various timing such as a case where the initialization is performed by a plurality of rotations of an optical disk.

Furthermore, in the aforementioned embodiment, although the case where the optical disk 2 was accessed under a condition that the angular speed was constant was described, the present invention is not limited to the case. The present invention is also applicable widely to such a case where the accessing is done under a condition that the linear speed is constant.

Furthermore, in the aforementioned embodiment, although the case where two optical pick-ups were used for recording the additional information was described, the present invention is not limited to the case. The additional information may be recorded by the use of a single optical pick-up.

Furthermore, in the aforementioned embodiment, although the case where the additional information was recorded in the servo area was described, the present invention is not limited to the case. The additional information may be recorded in various areas such as data area. It may be applicable to make it furthermore difficult to discover such a kind of information by recording dummy information together with the additional information or by combining the additional information with the dummy information to record the combined information discretely.

Furthermore, in the aforementioned embodiment, although the case where the information recording surface was formed with a phase change membrane was described, the present invention is not limited to the case. The present invention is widely applicable to a case where the informationrecording surface is constituted with a magnetic membrane.

Furthermore, in the aforementioned embodiment, although the case where the present invention was applied to an optical disk capable of recording and reproducing was described, the present invention is not limited to the case. The present invention is applicable to an optical disk exclusive for reproducing. In this case, there may be a case where the mastering of the optical disk is done so that the depths of the pits composing tracks and the depths of the pits allotted to the additional information are different for the purpose of making it possible to performing the tracking control focused to the pits constituting the tracks at the time of reproducing. It is considerable that encoded audio data, video data and the like are recorded as the additional information in the case of making an optical disk by such mastering. There may also be a case of stop reproducing in accordance with the existence of the additional information for protecting the interests of a copyright holder.

Furthermore, in the aforementioned embodiment, although the case where the disk ID information ED was obtained via communication means such as a telephone line was described, the present invention is not limited to the case. Various methods for generating the disk ID information ED such as a case where the disk ID information ED is generated by a random number generator are widely applicable.

Furthermore, in the aforementioned embodiment, although the case where only one series of the additional information in the additional information recorded inner and outer circumferences of one track was described, the present invention is not limited to the case. By disposing two series of the aforementioned second decoding circuits, the additional information recorded on both the inner and outer circumferences of one track may be reproduced simultaneously and in parallel. Furthermore, in correspondence with the reproduction side structure, on the record side, the additional information may be recorded on both the inner and outer circumferences of one track to allot two series of data to one track. Thereby, by recording those two series of data after carrying out an operation between the two series of data, it becomes possible that the encoded data is more difficult to analyze.

Furthermore, in the aforementioned embodiment, although the case where the present invention was applied to an optical disk was described, the present invention is not limited to the case. The present invention is widely applicable to various optical information recording media and optical information recording media systems such as a card-like optical information recording medium having a similar information recording surface.

Furthermore, in the aforementioned embodiment, although the case where the additional information is the disk ID information, the present invention is not limited to the case. For example, there may be a case where the optical disk is a legal copy and the additional information is permission information permitting recording on and/or reproducing of the optical disk. In such a case, it is believed to be possible to effectively protect the interest of a copyright by utilizing the permission information from the apparatus side.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. An optical information recording apparatus, comprising:

reproduction signal detecting means for detecting a reproduction signal in accordance with a pit train or a mark train formed on an optical information recording medium by irradiating a track composed of the pit train or the mark train with a first laser beam to receive a returned beam;

position detecting means for detecting a first irradiation position by the first laser beam in accordance with the reproduction signal to output a position detection result;

modulating signal generating means for generating a modulating signal by modulating additional information in accordance with the position detection result; and laser beam irradiating means for recording the additional information on the optical information recording medium by modulating a second laser beam with the modulating signal and by irradiating the optical information recording medium with the modulated second laser beam, said laser beam irradiating means irradiating a second irradiation position distant from the first irradiation position by the first laser beam by a prescribed distance at least in a direction perpendicular to the track with the second laser beam.

2. The optical information recording apparatus according to claim 1, wherein:

said optical recording medium is a disk-like recording medium, and said position detecting means outputs said position detection result on angular information on the disk-like recording medium.

3. The optical information recording apparatus according to claim 1, wherein said laser beam irradiating means irradiates a position between adjoining ones of said tracks with said second laser beam.

4. The optical information recording apparatus according to claim 1, wherein said modulating signal generating means includes binary numeral train generating means for generating a prescribed binary numeral train in accordance with said position detection result, and operating means for generating said modulating signal by operating the binary numeral train and said additional information.

5. The optical information recording apparatus according to claim 4, wherein said binary numeral train is an M series signal.

6. The optical information recording apparatus according to claim 5, wherein said binary numeral train generating means generates said M series signal so that said M series signal different at said second irradiation position of said second laser beam corresponding to a prescribed position on one track of said tracks in two irradiation loci adjoining to both sides of the one track.

7. The optical information recording apparatus according to claim 4, wherein said operating means is exclusive OR operating means for calculating an exclusive-OR of said binary numeral train and said additional information.

8. The optical information recording apparatus according to claim 1, wherein said additional information is an identification number peculiar to said optical information recording medium.

9. The optical information recording apparatus according to claim 1, wherein said additional information is a permission information permitting reproducing said optical information recording medium.

10. The optical information recording apparatus according to claim 1, wherein said additional information is information required for removing encoding of other information recorded on said optical information recording medium.

11. The optical information recording apparatus according to claim 1, wherein said pit train is allotted to a record of an adjusting signal for making fine adjustments to optical means for accessing said optical information recording medium by irradiating said optical information recording medium with said first laser beam.

12. The optical information recording apparatus according to claim 1, wherein said pit train is allotted to a record of address information to be used for accessing said optical information recording medium.

13. The optical information recording apparatus according to claim 1, wherein said prescribed distance is set so that a signal level of said reproduction signal, which varies in accordance with said pit train or said mark train, varies in accordance with said additional information recorded on an irradiation locus of said second laser beam adjoining to said track when said reproduction signal is detected by irradiating said track with said first laser beam.

14. A method for recording an optical information, said method comprising the steps of:

detecting a reproduction signal in accordance with a pit train or a mark train formed on an optical information recording medium by irradiating a track composed of the pit train or the mark train with a first laser beam to receive a returned beam;

detecting a first irradiation position by the first laser beam on the basis of the reproduction signal to output a position detection result;

generating a modulating signal by modulating additional information in accordance with the position detection result; and recording the additional information on the optical information recording medium by modulating a second laser beam with the modulating signal and by irradiating the optical information recording medium with the modulated second laser beam, wherein, in said recording step, the second laser beam is irradiated on a second irradiation position distant from the first irradiation position by the first laser beam by a prescribed distance at least in a direction perpendicular to the track.

15. The method for recording said optical information according to claim 14, wherein said step of generating said modulating signal includes the steps of:

generating a prescribed binary numeral train in accordance with said position detection result; and generating said modulating signal by operating the binary numeral train and said additional information.

16. The method for recording said optical information according to claim 14, wherein said prescribed distance is set so that a signal level of said reproduction signal, which varies in accordance with said pit train or said mark train, varies in accordance with said additional information recorded on an irradiation locus of said second laser beam adjoining to said track when said reproduction signal is detected by irradiating said track with said first laser beam.

17. An optical information recording medium, wherein:

additional information to a data recorded on a track composed of a first pit train or a first mark train is recorded as a second pit train or a second mark train at a position distant from the track by a prescribed distance, said second pit train or said second mark train being disposed substantially parallel to the track, said prescribed distance being set to be a distance where a signal level of a reproduction signal, which varies in accordance with the first pit train or the first mark train, varies in accordance with said additional information when the reproduction signal is detected by irradiating the track with a laser beam.

18. The optical information recording medium according to claim 17, wherein one bit of said additional information is allotted to a plurality of said second pit train or said second mark train.

19. The optical information recording medium according to claim 17, wherein said track is formed like a spiral or a concentric circle, and said second pit train or said second mark train corresponding to said additional information is allocated between tracks adjoining said second pit train or said second mark train.

20. The optical information recording medium according to claim 17, wherein said second pit train or said second mark train corresponding to said additional information is formed so as to correspond to a disturbance result of one bit of said additional information disturbed by a prescribed binary numeral series.

21. The optical information recording medium according to claim 17, wherein said additional information is information required for removing encoding of primary information recorded in a groove formed on said optical information recording medium.

22. The optical information recording medium according to claim 17, wherein an adjusting signal for minutely adjusting an optical means for accessing said track with said laser beam is allotted to said track.

23. The optical information recording medium according to claim 17, wherein address information is allotted to said track.

24. An optical information processing apparatus, comprising:

reproduction signal detecting means for detecting a reproduction signal, a signal level of which varies in accordance with a first pit train or a first mark train, by irradiating a track composed of the first pit train or the first mark train with a laser beam; and a reproduction signal processing means for reproducing additional information formed by a second pit train or a second mark train formed in the vicinity of said track on a cross talk component mixed to the reproduction signal by processing the reproduction signal.

25. The optical information processing means according to claim 24, wherein said reproduction signal processing means includes:

binary numeral series generating means for generating a binary numeral series with reference to said reproduction signal;

accumulative adding means for processing the reproduction signal on the binary numeral series to perform accumulative addition of a procession result by the binary numeral series; and determining means for determining an accumulative addition result by said accumulative adding means to reproduce said additional information.

26. The optical information processing apparatus according to claim 24, wherein said apparatus generates encoded data by encoding desired data on said additional information, and records the encoded data on said track formed as a groove on an optical information recording medium.

27. The optical information processing apparatus according to claim 24, said apparatus removes encoding of data recorded on said track formed as a groove on an optical information recording medium on said additional information.

28. A method for accessing an optical information recording medium, said method comprising the steps of:

irradiating a track composed of a first pit train or a first mark train formed on said optical information recording medium with a laser beam;

detecting a reproduction signal, a signal level of which varies in accordance with the first pit rain or the first mark train;

reproducing additional information composed of a second pit train or a second mark train formed in the vicinity of the track on a cross talk component mixed to the reproduction signal.

29. The method for accessing said optical information recording medium according to claim 28, said method further comprising the steps of:

generating a binary numeral series with reference to said reproduction signal;

processing the reproduction signal with the binary numeral series to perform accumulative addition of a procession result with the binary numeral series; and determining an accumulative addition result to reproduce said additional information.

30. The method for accessing said optical information recording medium according to claim 28, said method further comprising the steps of:

encoding desired data with said additional information, and recording the encoded data on said track formed as a groove on said optical information recording medium.

31. The method for accessing said optical information recording medium according to claim 28, said method further comprising the steps of:

removing encoding of data recorded on said track formed as a groove on said optical information recording medium with said additional information.

* * * * *

UNITED STATES PATENT AND TRADEMARK OFFICE
CERTIFICATE OF CORRECTION

PATENT NO. : 6,335,912 B1
DATED : January 1, 2002
INVENTOR(S) : Kobayashi et al.

It is certified that error appears in the above-identified patent and that said Letters Patent is hereby corrected as shown below:

Column 1,
Line 42, change "formaking" to -- for making --.

Column 2,
Line 55, change "are production" to -- a reproduction --.

Column 3,
Line 65, delete "with".

Column 6,
Line 38, add a period.

Column 9,
Line 15, change "crock" to -- clock --.

Column 10,
Line 51, change "opticaldisk" to -- optical disk --.

Column 12,
Line 1, change "amark" to -- a mark --.

Column 15,
Line 20, change "enduser" to -- end user --.
Line 62, change "informationrecording" to -- information recording --.

Column 16,
Line 61, change "sprit" to -- spirit --.

UNITED STATES PATENT AND TRADEMARK OFFICE
CERTIFICATE OF CORRECTION

PATENT NO. : 6,335,912 B1
DATED : January 1, 2002
INVENTOR(S) : Kobayashi et al.

It is certified that error appears in the above-identified patent and that said Letters Patent is hereby corrected as shown below:

Column 20,
Line 21, change "rain" to -- train --.

Signed and Sealed this

Sixth Day of August, 2002

Attest:

JAMES E. ROGAN
Attesting Officer
Director of the United States Patent and Trademark Office